Sept. 19, 1961  A. U. BRYANT  3,000,083
METHOD FOR THE MANUFACTURE OF VALVES
Filed June 27, 1955  4 Sheets-Sheet 1
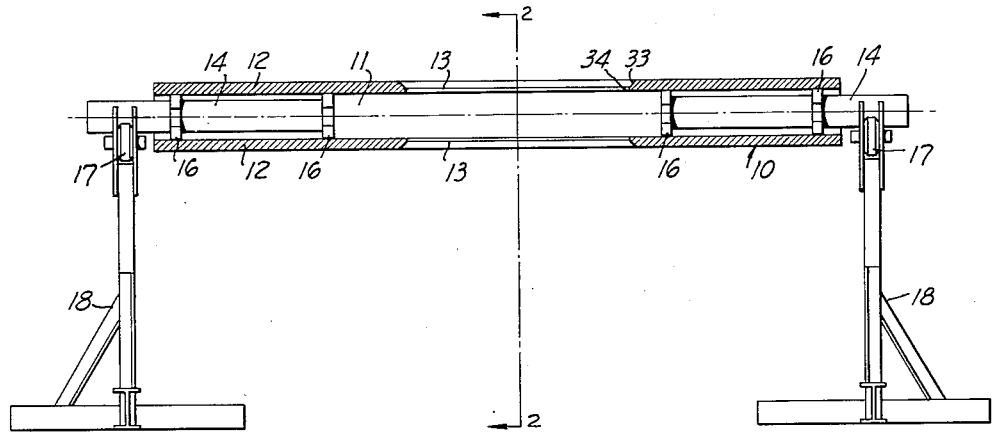
FIG_1_
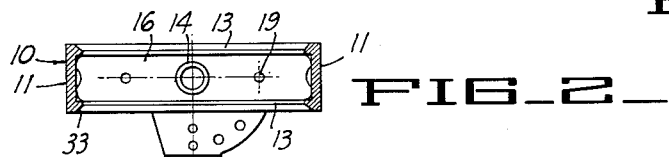
FIG_2_
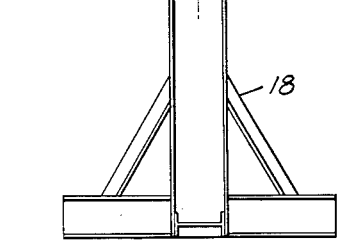
FIG_3_
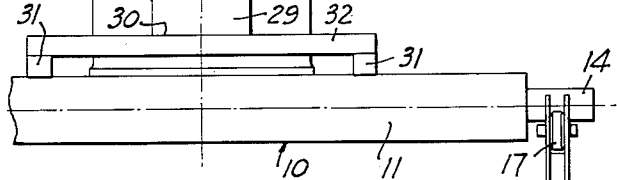
FIG_4_
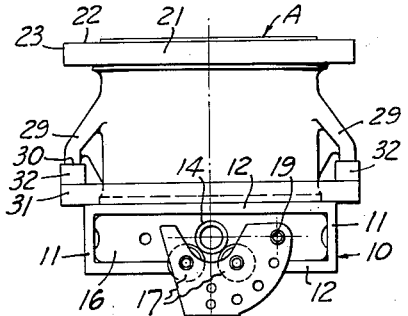
INVENTOR.
Austin U. Bryant
BY
ATTORNEYS

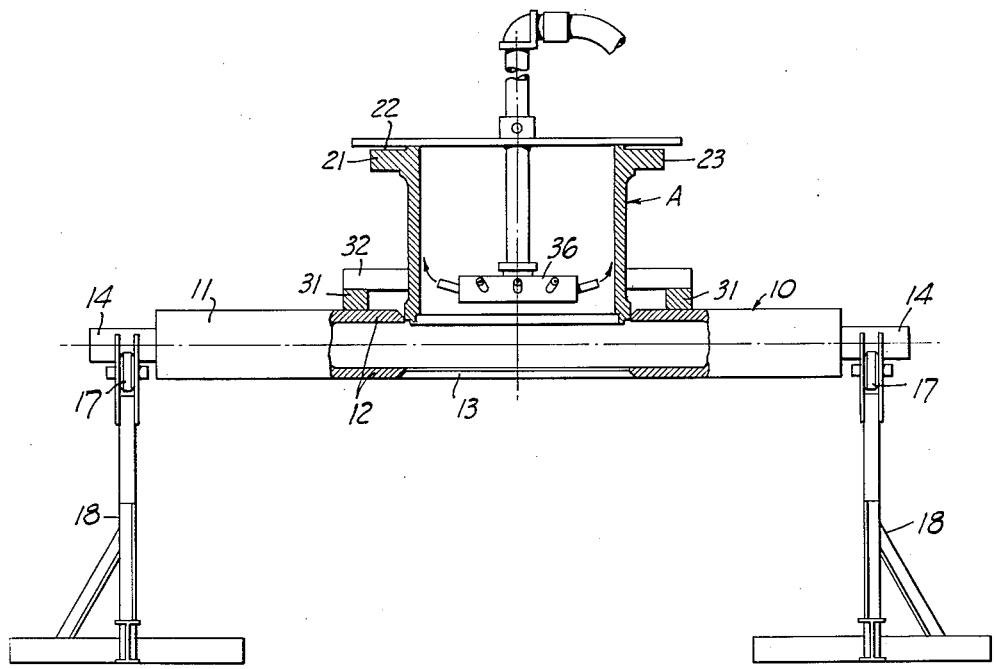
FIG_5_
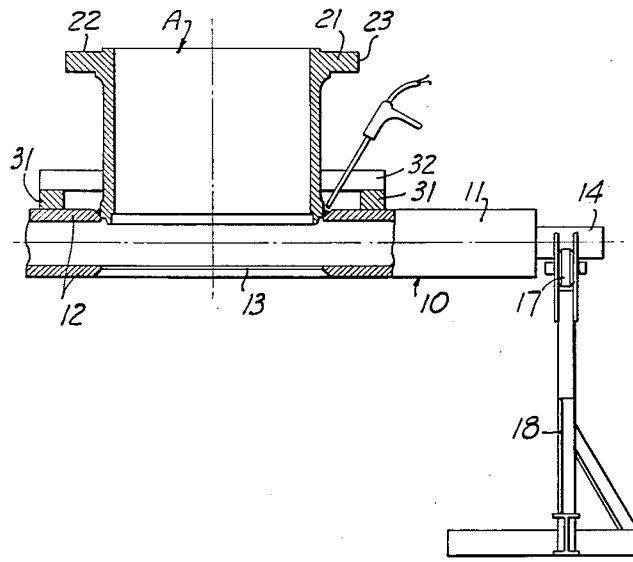
FIG_6_
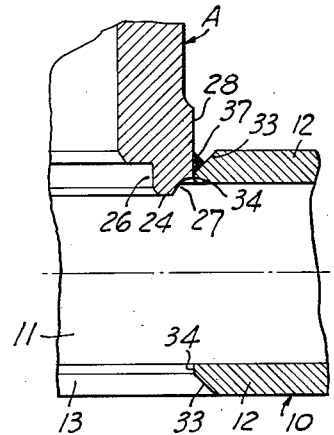
FIG_7_
INVENTOR.
Austin U. Bryant

Sept. 19, 1961  A. U. BRYANT  3,000,083
METHOD FOR THE MANUFACTURE OF VALVES
Filed June 27, 1955  4 Sheets-Sheet 3
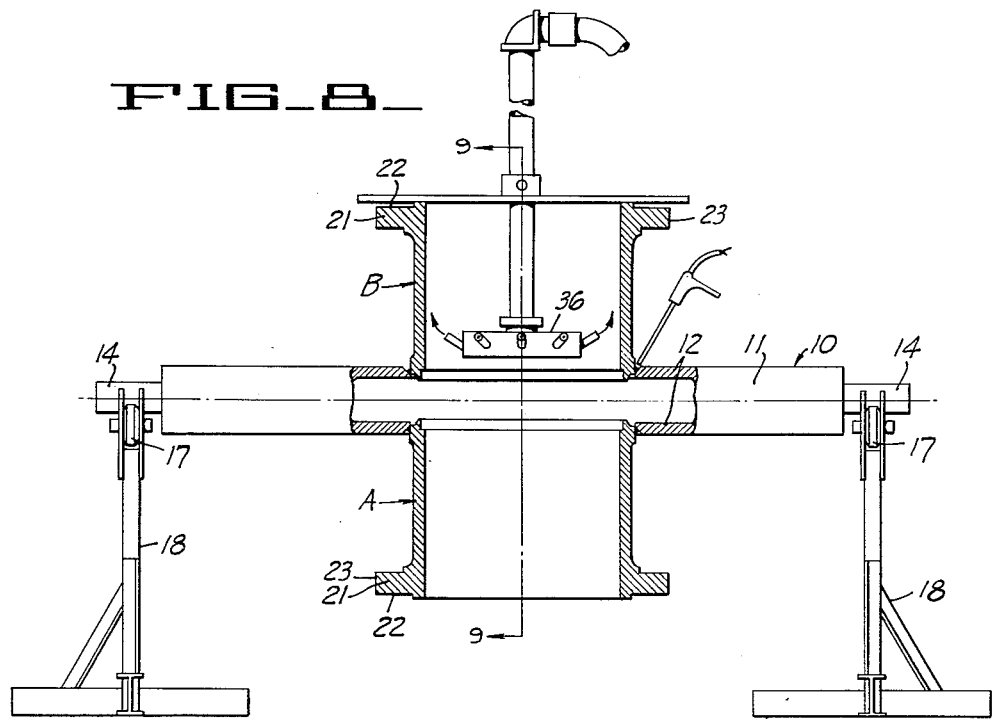
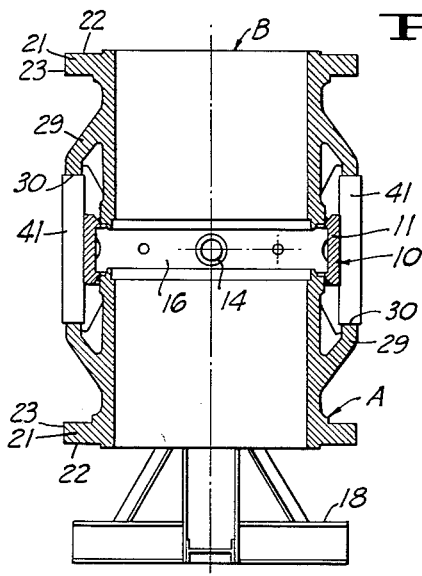
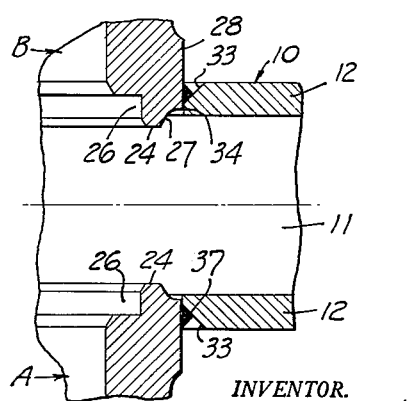
INVENTOR.
Austin U. Bryant
BY
ATTORNEYS Sept. 19, 1961  A. U. BRYANT  3,000,083
METHOD FOR THE MANUFACTURE OF VALVES
Filed June 27, 1955  4 Sheets-Sheet 4
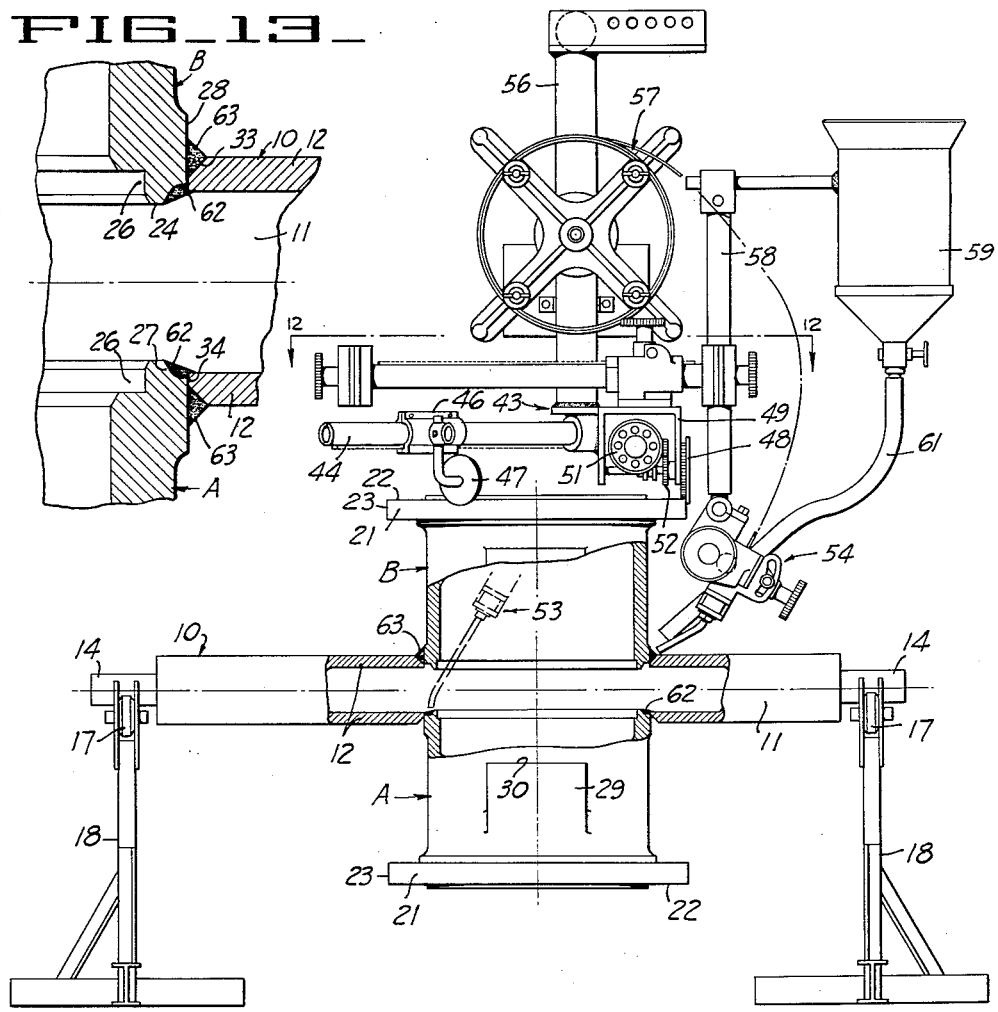
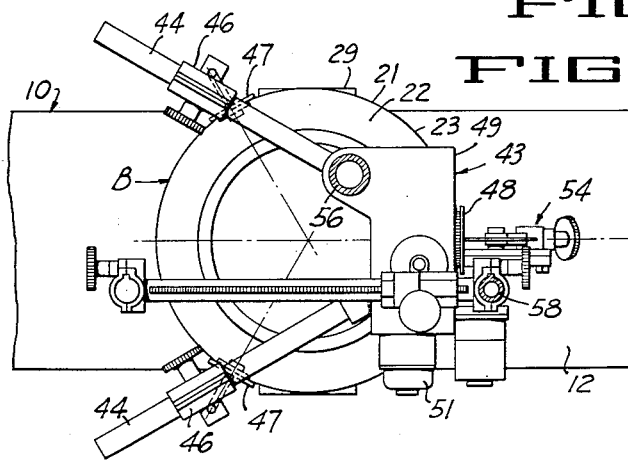
INVENTOR.
Austin U. Bryant
BY
ATTORNEYS

United States Patent Office 3,000,083
Patented Sept. 19, 1961

3,000,083
METHOD FOR THE MANUFACTURE OF VALVES
Austin U. Bryant, Walnut Creek, Calif., assignor to Grove Valve and Regulator Company, Oakland, Calif., a corporation of California
Filed June 27, 1955, Ser. No. 518,080
4 Claims. (Cl. 29—157.1)

This invention relates generally to methods for the manufacture of valve bodies of the type intended for use with a sliding closure gate.

In copending application Serial No. 498,253, filed March 31, 1955, now Patent No. 2,904,306, there is disclosed a valve of the gate type making use of a fabricated valve body. The main part of the valve body which accommodates the sliding gate is made by welding together simple structural elements, such as channels, angles and plates, and the like, and is rectangular or box-like in section. Opposite front walls of the main body part are provided with aligned openings which accommodate the pipe coupling hubs. Circular welds are required between the ends of the hub and the main part of the body. The final body should have the end faces of the aligned hubs (which make connection with associated piping) substantially parallel and spaced apart within predetermined dimensional limits.

It is a general object of the present invention to provide a manufacturing procedure or method which will produce valve bodies of the type described above without undue expense, and with the required accuracy and uniformity.

Another object of the invention is to provide a method of the above character which will facilitate carrying out the necessary circular welding operations.

Another object of the invention is to provide a procedure which will result in a final product of sufficient accuracy that only a minor amount of machining is required before final assembly of the valve.

Another object of the invention is to provide a method particularly useful for the manufacture of a fabricated valve of the type disclosed in the above-mentioned application Serial No. 498,253, filed March 31, 1955, now Patent Number 2,904,306.

Additional objects and features of the invention will appear from the following description in which the preferred embodiment has been set forth in detail in conjunction with the accompanying drawing.

Referring to the drawing:

FIGURE 1 is a side elevational view in section illustrating a main body part of a valve preparatory to applying the hubs;

FIGURE 2 is a cross sectional view taken along the line 2—2 of FIGURE 1;

FIGURE 3 is a view like FIGURE 1 showing the location of a first hub upon the main body part;

FIGURE 4 is an end view of the main body part and its supporting means, looking toward the right hand end of FIGURE 3;

FIGURE 5 is a side elevational view like FIGURE 1 showing a first hub applied to the main body part, and also showing a burner inserted in the hub for a pre-heating operation.

FIGURE 6 is a view like FIGURE 5 indicating a hand welding operation for making a light weld between the hub and the upper wall of the main body part;

FIGURE 7 is a cross sectional detail illustrating a light weld such as is applied in FIGURE 6;

FIGURE 8 is a side elevational view like FIGURE 1 showing the assembly inverted, a second hub applied to the main body part, a burner introduced into the second hub for a pre-heating operation, and a hand welding operation such as indicated in FIGURE 6;

FIGURE 9 is a cross sectional view taken along the line 9—9 of FIGURE 8, but with the pre-heating burner removed;

FIGURE 10 is an enlarged cross sectional detail illustrating light welds on both of the hubs, preparatory to machine welding operations;

FIGURE 11 is a side elevational view, partly in section, illustrating interior and exterior circular machine welding operations, and suitable apparatus for carrying out the same.

FIGURE 12 is a cross sectional view taken along the line 12—12 of FIGURE 11; and FIGURE 13 is an enlarged cross sectional detail illustrating the welds produced by the machine welding operations.

In FIGURES 1 and 2, I have shown a main body part 10 consisting of the side walls 11 and front walls 12. Such a body can be fabricated from channels, angles, or angles and plates, in the manner disclosed in the above-mentioned co-pending application. The parallel front walls 12 are provided with aligned openings 13 for accommodating the pipe coupling hubs. While these openings can be formed by conventional metal machine cutting operations, it is preferable to form them by the use of cutting torches. Preparatory to carrying out the various operations for attaching the coupling hubs, the main body part is supported in horizontal position by means permitting it to be inverted. In the present instance this means consists of mandrels 14 which are carried by the insert plates 16. At each end of the body the projecting mandrel is supported by rollers 17 which are mounted upon the support stands 18. Some means such as a lock pin 19 can be used for locking the body in horizontal position.

Although the coupling hubs employed are identical in construction, they are designated in the drawing by the letters A and B. Each hub is provided with a machined coupling flange 21 having a machined end face 22 and a machined periphery 23. The other end of the hub is machined in the manner described in said co-pending application, as for example in the manner illustrated in FIGURE 7. The machined surfaces in this instance include the end face 24, the recess 26 for accommodating a seat ring for the valve, an exterior recess or bevel 27 for receiving weld metal, and the periphery 28. The sides of the hub are provided with two pads 29 which have machined end faces 30. As disclosed in said co-pending application, the pads 29 in the final body are welded to tie bars which make direct connections between the two hubs.

In machining the surfaces referred to above, the two ends of the hub are made true with respect to each other, and the end faces 30 of the pads are located in a common plane that is parallel to the ends of the hub and at predetermined distances between the same.

FIGURES 3 and 4 illustrate the way in which the first hub A is located upon the main body part. Cross bars 31, together with the longitudinal bars 32, serve to space the end faces 30 of the pads 29 a predetermined distance from the exterior faces of the walls 12. Some shimming may be resorted to by the operator for more accurate location of the hub. The lower end of the hub is accommodated in the opening 13 in the manner illustrated in FIGURE 5. Since holes 13 are cut to a diameter somewhat greater than the diameter of the surface 28, some clearance will exist between the hub and the upper body wall 12. The insertion is preferably such that the recess 27 (FIG. 7) is set back a small amount from the inner surface of wall 13 to provide an optimum inner groove or recess for receiving weld metal. Both the holes are provided with bevelled surfaces 33 which form a V recess in conjunction with the machined surface 28, for receiving weld metal. A small amount of overlap is provided between the inner end of the peripheral surface 28 and the peripheral surface 34 of the adjacent hole (FIGURE 7).

The next step of the method is to heat the hub to thereby expand it within the hole 13. As illustrated in FIGURE 5, a suitable gas burner 36 can be lowered into the hub to a position a short distance above the lower end. In a typical instance heating of the hub to a temperature level of the order of 400 to 600° F. will suffice to expand the hub into contact with the surface 34, thus eliminating the clearance between these parts. While the hub is in this pre-heated condition, a light bead 37 of weld metal (FIGURE 7) is applied by hand welding. This bead forms a bond between the hub and the main body part preparatory to a machine welding operation, and is sufficient to retain the hub upon the body for the operations preceding machine welding. The locating bars 31 and 32 ae now removed.

The next procedure is to invert the main body part together with hub A, and to apply the hub B in the manner illustrated in FIGURE 8. Instead of locating the hub B by the use of bars 31 and 32, spacer blocks 41 (FIGURE 9) are employed to locate the faces 30 of hub B with respect to the corresponding faces of hub A. Since the faces 30 of both hubs are accurately located with respect to the machined ends of the hubs, it will be evident that this procedure serves to space the flanges 21 a predetermined distance apart, and to bring the flange faces 22 parallel. The burner 36 is again inserted in the hub B in the manner illustrated in FIGURE 8 to carry out a similar heating operation. After heating, hand welding is again carried out to apply a light weld 37. After the second hub has been applied, the assembly is substantially as illustrated in FIGURE 9. The spacer blocks 41 can now be removed.

The next operations consist in carrying out interior and exterior circular machine welding operations. The machine welding means illustrated in FIGURE 11 is similar to that disclosed in co-pending application Serial No. 466,325, filed November 2, 1955, now Patent 2,777,937. It consists of a frame 43 having arms 44 arranged V fashion. Devices 46 are adjustably clamped to the arms and serve to mount the flanged wheels 47. Another flanged wheel 48 is carried by the frame bracket 49 and is driven by the electric motor 51 through speed reducing gearing 52. When the machine is in operation, the rollers 47 and 48 engage and operate upon the machined hub flange 21.

The frame 43 supports two welding heads 53 and 54 which are designed for interior and exterior circular welding operations. Although these heads can be supported by the same machine, it is evident that two machines can be employed, one having an internal welding head and the other an external head.

As illustrated in FIGURE 11, the machine may include a vertical standard 56 which serves to mount the welding rod reel 57. Also the frame of the machine serves to mount the adjustable member 58 which supports the flux hopper 59 and welding head 54. The flux hopper is shown provided with a discharge hose 61 of resilient material for delivering powdered flux to the area where the weld metal is being applied. As is well known to those familiar with machine welding operations, welding equipment of this type utilizes the submerged arc welding method, whereby the arc where the weld metal is being applied is completely submerged by a granular flux of the prefused type. The welding head 53 can be similarly supported from the frame of the machine by suitable means (not shown), and its construction should be such as to enable it to weld on the lower wall 12 of the valve body, in the manner illustrated in FIGURE 11.

Assuming use of the machine illustrated in FIGURE 11, it is seated upon the upper hub and the head 53 adjusted for forming an interior weld 62 between the lower hub and the lower wall 12 of the body. A complete interior weld of this type is illustrated in FIGURE 13. Following the interior weld on the lower hub, the welding machine is lifted while the assembly is inverted. The machine is again seated upon the upper hub and head 53 employed to form a similar interior weld between the body and the lower hub. Following completion of the two interior welds, the head 54 is adjusted to operate between the upper hub and the body. An exterior weld between the upper hub and the body is now formed, preferably by repeated passes of the welding head. Following this operation the welding machine is lifted from the upper hub, the assembly inverted, and a second exterior welding operation carried out between the new upper hub and the body. The completion of all of these welds is illustrated in FIGURE 13.

After the welding of both hubs has been completed, it is desirable to refinish the surfaces 24 to provide for the accuracy desired for placing the seat rings and for assemblying the closure gate and other parts of the valve. Such machine operations can be readily carried out to bring the surfaces 24 more exactly parallel and to a predetermined spacing, with similar more accurate machining of the surfaces forming the recesses 26.

It will be evident that the invention is not confined to the precise order of the welding operations described above.

In some instances, as for example in the manufacture of valves for the lower pressures, the pads 29 may be omitted. In such instances the hubs must be positioned by reference to some suitable machined surface, as for example surfaces on the end flanges.

For the smaller sized valves, as for example 8″ pipe sizes or less, the hand welding operation can be omitted, and the hubs seated within more accurately made (e.g. machined) holes formed in the valve body preparatory to the machine welding operation. Each hub may be attached by tack welding and then machine welded in the manner previously described, commencing with the interior welds. In some instances it may be convenient to apply the inner welds by hand, followed by the exterior machine welds.

It will be evident from the foregoing that my method described makes possible production line manufacture of fabricated valves. It facilitates positioning of the hubs preparatory to the final welding operations, and the machine welding operations required between the hubs and the body. It also makes possible the manufacture of valve body assemblies to a high degree of accuracy, and the amount of handling and other time consuming operations is reduced to a minimum.

I claim:

1. In a method for the manufacture of valve bodies of the type including a main body part together with pipe coupling hubs having machined ends and side pads presenting machined end faces that are true with respect to the machined ends, the method making use of arc welding means of the submerged arc type adapted to track upon an annular surface and make a circular weld; the steps of locating a first hub upon one horizontal front wall of the main body part with a machined end of the hub inserted in an opening in the upper wall of the body part, said location being established by supporting the machined faces of the pads a predetermined distance from the upper face of said body part, heating the hub to expand it in the opening, lightly welding the hub to the upper wall of the body part, inverting the main body part together with said first hub, applying a similar second hub upon the upper wall of the main body part with one machined end of the same inserted in the corresponding opening, said second hub being located by spacing the end faces of its pads a predetermined distance from the end faces of the pads of the first hub, heating the second hub, applying a light application of weld metal between the second hub and the corresponding upper wall of the body, applying said arc welding means to the second hub to track upon the machined end of the same, utilizing said welding means to form a circular interior weld between the first hub and the lower wall of the body, inverting the assembly, applying the welding means to the first hub, utilizing said welding means to form a circular interior weld between the second hub and the lower wall of the body, utilizing the welding means for forming an exterior circular weld between the first hub and the body, inverting the assembly, reapplying the welding means to the upper machined end of the second hub, and then utilizing the welding means for forming an exterior circular weld between the second hub and the lower wall of the body.

2. In a method for the manufacture of valve bodies of the type including a body part having both parallel front walls together with pipe coupling hubs having machined ends, the method making use of arc welding means adapted to be supported by and to track upon an annular surface to make a circular weld; the steps of locating and lightly attaching hubs to the opposite front walls of the main body part with the axes of the hubs aligned and with the opposed ends of the same inserted in corresponding openings provided in the front walls, supporting the welding means on the outer end of the one hub with the common axis of the hubs vertical, utilizing said welding means to form a circular weld within the body and between the innermost end of the other hub and the lower front wall of the body, shifting the welding means from the outermost end of said one hub to the outermost end of said other hub, and utilizing said welding means that is supported on said other hub to form a circular weld within the body between the innermost end of said one hub and the adjacent front wall of the body.

3. A method as in claim 2 in which the welding means is used to form exterior circular welds between both hubs and the front walls.

4. In a method for the manufacture of valve bodies of the type including a main body part together with pipe coupling hubs having machined ends and pads presenting machined end faces that are true with respect to the machined ends, the method making use of welding means of the arc type adapted to be supported upon and to track upon an annular surface and make a circular weld; the steps of locating a hub upon one horizontal front wall of the main body part with the machined end of the hub inserted in an opening in the upper wall of the body part, said location being established by supporting the machined faces of the pads a predetermined distance from the upper face of said body part, lightly welding the hub to the upper wall of the body part, inverting the main body part together with the attached hub, applying a similar hub upon the upper wall of the main body part with one machined end of the same inserted in the corresponding opening, said last named hub being located by spacing the end faces of its pads a predetermined distance from the end faces of the pads of the first named hub and in axial alignment therewith, lightly welding the second applied hub to the corresponding wall of the body, applying said arc welding means to the exterior machined ends of the hubs to track upon the same and utilizing said welding means to form interior and exterior circular welds between both the hubs and their associated body walls.

References Cited in the file of this patent

UNITED STATES PATENTS

| | | |
|---|---|---|
| 1,101,084 | McCarty | June 23, 1914 |
| 1,508,713 | Noble | Sept. 16, 1924 |
| 1,787,580 | Jasper | Jan. 6, 1931 |
| 1,875,483 | Naylor | Sept. 6, 1932 |
| 1,949,251 | Gilbert | Feb. 27, 1934 |
| 1,987,341 | Kachel | Jan. 8, 1935 |
| 2,034,418 | Plant | Mar. 17, 1936 |
| 2,208,180 | Delleani | July 16, 1940 |
| 2,387,154 | Kalwitz | Oct. 16, 1945 |
| 2,419,243 | Allen et al. | Apr. 22, 1947 |
| 2,448,329 | Schwinn | Aug. 31, 1948 |
| 2,510,083 | Davis et al. | June 6, 1950 |
| 2,777,937 | Bryant | Jan. 15, 1957 |